(12) United States Patent
Yang et al.

(10) Patent No.: US 11,458,439 B2
(45) Date of Patent: Oct. 4, 2022

(54) METHOD FOR PREPARING MEMBRANE AND ASSOCIATED MEMBRANE AND FILTER ELEMENT

(71) Applicant: GENERAL ELECTRIC COMPANY, Schenectady, NY (US)

(72) Inventors: Linglu Yang, Shanghai (CN); Peng Wang, Singapore (CN); Su Lu, Shanghai (CN); Zhen Liu, Shanghai (CN); Yun Peng, Shanghai (CN); Lawrence C. Costa, Mansfield, MA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 16/065,991

(22) PCT Filed: Dec. 19, 2016

(86) PCT No.: PCT/US2016/067417
§ 371 (c)(1),
(2) Date: Jun. 25, 2018

(87) PCT Pub. No.: WO2017/112555
PCT Pub. Date: Jun. 29, 2017

(65) Prior Publication Data
US 2019/0083940 A1    Mar. 21, 2019

(30) Foreign Application Priority Data
Dec. 24, 2015    (CN) .................. 201510988082.X

(51) Int. Cl.
*B01D 69/06*    (2006.01)
*B01D 69/10*    (2006.01)
(Continued)

(52) U.S. Cl.
CPC .......... *B01D 69/105* (2013.01); *B01D 63/10* (2013.01); *B01D 67/0013* (2013.01);
(Continued)

(58) Field of Classification Search
None
See application file for complete search history.

(56) References Cited

U.S. PATENT DOCUMENTS 3,912,834 A * 10/1975 Imai ................. B01D 69/10
                                                                           427/316
4,259,183 A * 3/1981 Cadotte ............. B01D 69/125
                                                                      210/500.28
(Continued)

FOREIGN PATENT DOCUMENTS

CN        102131566 A     7/2011
CN        106914139 A *   7/2017 ............ B01D 63/10
(Continued)

OTHER PUBLICATIONS

Patent Application CN-106914139-A,, Office Action dated Feb. 19, 2019, Machine Translation, 7 pages. (Year: 2019).*
(Continued)

*Primary Examiner* — Chester T Barry

(57) ABSTRACT

The disclosure of the present invention relates to a method for preparing membrane and associated membrane and filter element. The method comprises providing a porous substrate having a plurality of pores; and applying a pre-filler solution to at least partially occupy the pores in the porous substrate. The membrane comprises a porous substrate and a filter layer formed on the porous substrate. The filter element comprises a core tube; and a membrane as prepared and rolled around the core tube.

19 Claims, 3 Drawing Sheets

(51) Int. Cl.
  *B01D 67/00* (2006.01)
  *B01D 71/68* (2006.01)
  *B01D 63/10* (2006.01)
  *B01D 69/02* (2006.01)
  *B01D 69/12* (2006.01)

(52) U.S. Cl.
  CPC ......... *B01D 67/0016* (2013.01); *B01D 69/02* (2013.01); *B01D 69/06* (2013.01); *B01D 69/12* (2013.01); *B01D 71/68* (2013.01); *B01D 2313/143* (2013.01); *B01D 2323/21* (2013.01); *B01D 2323/26* (2013.01); *B01D 2323/46* (2013.01); *B01D 2325/022* (2013.01); *B01D 2325/04* (2013.01)

(56) References Cited

U.S. PATENT DOCUMENTS

| | | | | |
|---|---|---|---|---|
| 4,980,069 | A * | 12/1990 | Gauger | B01D 67/0088 210/490 |
| 5,570,503 | A | 11/1996 | Stokes | |
| 5,702,503 | A * | 12/1997 | Tse Tang | B01D 53/228 427/434.3 |
| 6,391,200 | B2 * | 5/2002 | Pulek | B01D 25/24 210/497.1 |
| 6,454,942 | B1 * | 9/2002 | Shintani | B01D 63/10 210/321.72 |
| 7,048,855 | B2 * | 5/2006 | de la Cruz | B01D 63/10 210/321.74 |
| 8,231,013 | B2 * | 7/2012 | Chu | A61L 15/425 210/500.1 |
| 2004/0045892 | A1 * | 3/2004 | De La Cruz | B01D 63/10 210/321.74 |
| 2004/0124134 | A1 * | 7/2004 | Irie | B01D 63/10 210/321.85 |
| 2008/0149561 | A1 | 6/2008 | Chu et al. | |
| 2010/0075101 | A1 * | 3/2010 | Tang | B01D 69/125 428/92 |
| 2012/0318729 | A1 | 12/2012 | Yip et al. | |

FOREIGN PATENT DOCUMENTS

| | | | |
|---|---|---|---|
| WO | 2009125218 A1 | 10/2009 | |
| WO | WO-2009125218 A1 * | 10/2009 | .......... B01D 53/228 |
| WO | 2011153085 A2 | 12/2011 | |

OTHER PUBLICATIONS

Patent Application CN-106914139-A,, Office Action dated Oct. 16, 2019, Machine Translation, 8 pages. (Year: 2019).*
European Patent Application No. 16823426.8, Office Action dated Aug. 12, 2019.
International Application No. PCT/US2016/067417, Search Report and Written Opinion dated Apr. 5, 2017.
International Application No. PCT/US2016/067417, International Preliminary Report on Patentability dated Jun. 26, 2018.
GCC Patent Application No. GC 2016-32652, Examination Report dated Feb. 17, 2019.
GCC Patent Application No. GC 2016-32652, Examination Report dated Jul. 22, 2019.
Chinese Patent Application No. 201510988082.X, Office Action dated Feb. 19, 2019.
Chinese Patent Application No. 201510988082.X, Search Report dated Feb. 11, 2019.
Chinese Patent Application No. 201510988082.X, Office Action dated Oct. 16, 2019.
China Patent Application No. CN201510988082, Office action dated Mar. 18, 2020.
China Patent Application No. CN201510988082, Office action dated Feb. 21, 2022.
Conggui, Chen and Zhang Guozhi, "Food Machinery And Equipment," Southeast University Press, Jul. 2009, p. 150.
European Patent Application No. 16823426.8, Office Action dated Mar. 28, 2022.
Yingqi, Ye, "Industrial Water Treatment Technology," Shanghai Science Popularization Press, Oct. 1996, p. 169.
Chinese Patent Application No. CN201510988082.X, Decision on Reexamination dated Jul. 8, 2022.

* cited by examiner

METHOD FOR PREPARING MEMBRANE AND ASSOCIATED MEMBRANE AND FILTER ELEMENT

BACKGROUND

The present disclosure relates to methods for preparing membranes and associated membranes and filter elements.

Currently available filter elements comprising membranes are not satisfactory in one way or another. For example, for some applications, the thickness of the filter elements may be too big and the flux of the filter element may be too low. In addition, the simplification of the membranes and the filter element is always desirable.

Accordingly, there is a need to provide a novel method for preparing a membrane, and associated membrane and filter element.

BRIEF DESCRIPTION

An object of an exemplary embodiment of the present invention is to overcome the above and/or other deficiencies in the prior art.

In one aspect, embodiments of the present invention relate to a method for preparing a membrane, comprising: (1) providing a porous substrate having a mean pore size of 50-1000 microns; (2) applying a pre-filler solution to at least partially occupy the pores in the porous substrate; (3) applying a membrane solution to the porous substrate applied with the pre-filler solution; and (4) solidifying the membrane solution to form a filter layer on the porous substrate.

In another aspect, embodiments of the present invention relate to a membrane as prepared according to the embodiments of the present invention.

In yet another aspect, embodiments of the present invention relate to a filter element, comprising: (1) a core tube; and (2) a membrane prepared according to embodiments of the present invention and rolled around the core tube.

BRIEF DESCRIPTION OF THE DRAWINGS

The present invention can be understood better in light of the description of exemplary embodiments of the present invention with reference to the accompanying drawings, in which.

DETAILED DESCRIPTION

Unless defined otherwise, all the technical or scientific terms used in the claims and the descriptions should have the same meaning as commonly understood by one of ordinary skill in the art to which the present disclosure belongs.

The terms "first", "second" and the like in the description and the claims do not mean any sequential order, number or importance, but are only used for distinguishing different components.

The terms "a", "an" and the like do not denote a limitation of quantity, but denote the existence of at least one.

The terms "comprises", "comprising", "includes", "including", "has", "have" "having" and the like mean that the element or object in front of the "comprises", "comprising", "includes", "has", "have", "having" and "including" covers the elements or objects and their equivalents illustrated following the "comprises", "comprising", "includes", "has", "have", "having" and "including", but do not exclude other elements or objects.

The term "bonded" or the like is not limited to being connected physically or mechanically, nor limited to being connected directly or indirectly.

The term "applying" comprises, but not limited to, adding, coating (e.g., spraying coating), covering or the like, which is not limited to being contacted directly or indirectly, nor limited to be applied partially or completely.

The porous substrate as disclosed herein refers to a substrate having a porous structure. In some embodiments, the porous substrate comprises a permeate carrier. The permeate carrier as disclosed herein refers to a polymeric carrier having a porous structure to guide the permeated flow. The polymers used in the permeate carriers include, but are not limited to, polyethylene terephthalate (PET), polytetrafluoroethylene (PTFE), polyolefin, polyester, or any combinations thereof.

Figure 1:
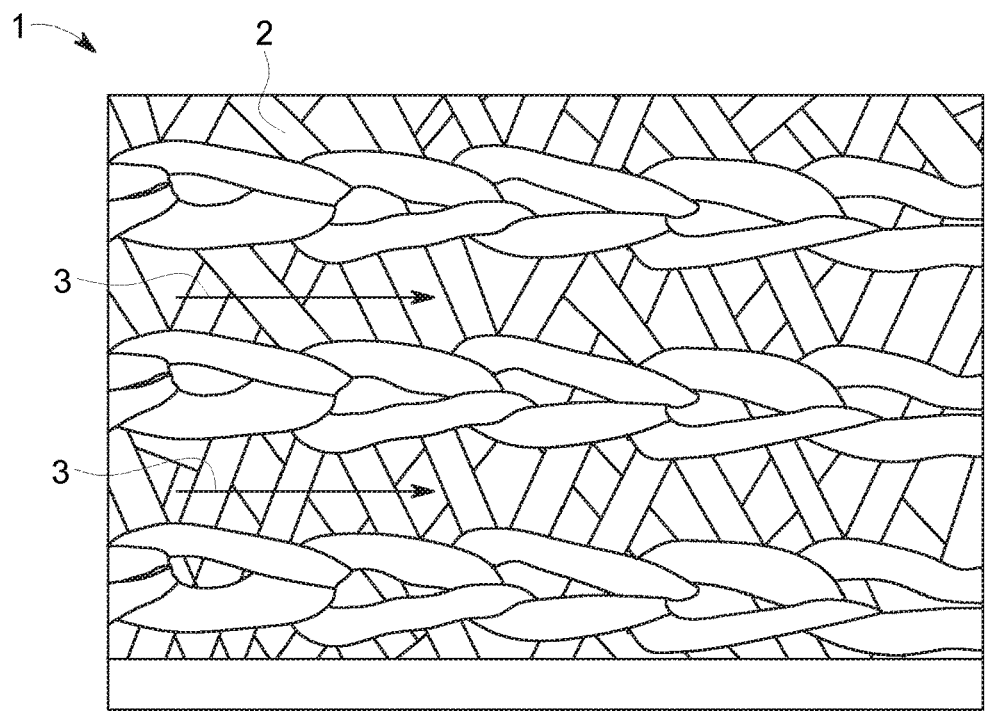
FIG. 1 shows a scanning electron microscopy (SEM) image of a side of a porous substrate comprising flow channels in accordance with some embodiments of the present invention.

In some embodiments, the porous substrate 1 has an asymmetric structure. In some embodiments, a first side 2 of the porous substrate 1 comprises flow channels 3 (see, FIG. 1) and may also be referred to as a flow channel side. An opposite second side 4 of the porous substrate 1 includes a plurality of pores 5 (see, FIG. 2) and may also be referred to as a porous side.

In some embodiments, the porous substrate has a thickness in a range of from 250 microns to 500 microns, 250 microns to 400 microns, or from 280 microns to 350 microns. In some embodiments, the mean pore size of the porous substrate is in a range of from 50 microns to 1000 microns, from 150 microns to 800 microns, from 150 microns to 400 microns, from 150 microns to 300 microns or 350-1000 microns. The mean pore size as disclosed herein may be measured according to GB/T 2679.14-1996 in case of a fibrous porous substrate, or measured using an optical or electron microscopy direct measuring method in case of non-fibrous porous substrate.

In some embodiment, the first side 2 is applied with a pre-filler solution, and the second side 4 is applied with a membrane solution. In some embodiments, the second side 4 is applied with a pre-filler solution, and the first side 2 is applied with a membrane solution.

The pre-filler solution as disclosed herein refers to a solution used to fill the porous structure. In some embodiments, the pre-filler solution comprises water, organic liquids, or any combination thereof. In some embodiments, the organic liquids comprise an alcohol, glycerol, ethylene glycol, N,N-dimethyl formamide (DMF), N-methyl pyrrolidone (NMP), dimethyl sulfoxide (DMSO), dimethylacetamide (DMAc) or any combination thereof. In some embodiments, the alcohol comprises methanol, ethanol, isopropanol, or any combinations thereof.

In some embodiments, the pre-filler solution comprises a component for solidifying a membrane solution applied thereafter. The component comprises water, ethanol, ethylene glycol or any combinations thereof.

The membrane solution refers to a solution for forming a filter layer. In some embodiments, the filter layer comprises a microfiltration (MF) layer, an ultrafiltration layer (UF), a nanofiltration (NF) layer, a reverse osmosis (RO) layer, or any combinations thereof. In some embodiments, the filter layer is formed by solidifying (curing) a membrane solution.

In some embodiments, the membrane solution comprises, polysulfone (PSU), polypropylene (PP), polyvinylidene fluoride (PVF), polyethersulfone (PES), polyacrylonitrile (PAN); polyvinyl chloride (PVC), polyvinyl alcohol (PVA), cellulose acetate (CA), polyimide (PI), polytetrafluoroethylene (ePTFE or PTFE), polyamides, polyvinyl formaldehyde, or any combinations thereof.

Figure 3:
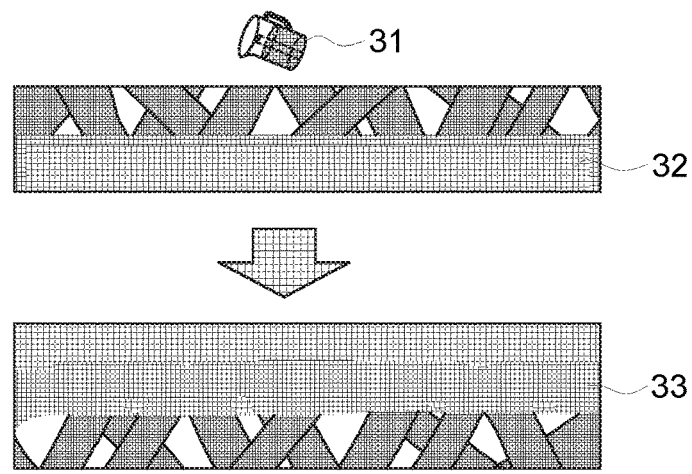
FIG. 3 shows a schematic drawing of a method for preparing a membrane according to one exemplary embodiment of the present invention.

Referring to FIG. 3, a method for preparing a membrane according to one exemplary embodiment of the present invention comprises: providing a porous substrate; applying a pre-filler solution 31 to the porous substrate to at least partially occupy the pores of the porous substrate; applying a membrane solution e.g., PSU solution) to the porous substrate 32; and solidifying the membrane solution to form a filter layer 33.

In some embodiments, the pre-filler solutions on the top part of porous substrate may be removed, for example, by paper or absorption mat or the pressure provided by rubber roller.

In some embodiments, applying a membrane solution comprises adding, coating (e.g., spraying coating), and/or covering a membrane solution.

In some embodiments, solidifying a membrane solution comprises heating curing, disposing into a water or alcohol gel bath, and/or ultraviolet curing the membrane solution.

Figure 4:
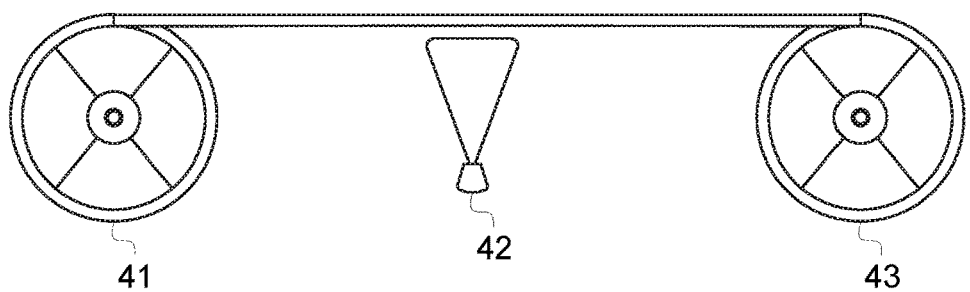
FIG. 4 shows a schematic drawing of a method for preparing a membrane in accordance with another exemplary embodiment of the present invention.

Referring to FIG. 4, it shows another exemplary embodiment of the present invention for preparing a membrane in a continuous wetting process. In the continuous wetting process, two ends of the porous substrate are rolled onto a pair of rollers 41 and 43. Between the pair of rollers, one row of nozzles 42 are disposed below the porous substrate, wherein the row of nozzles 42 is in fluid communication with a vessel comprising a pre-filler solution. The row of nozzles may be operated at an operation pressure of 1-5 bars.

During operation, the porous substrate is unwounded from a roller, passes through the nozzles and is re-wound around the other roller. The speed may be 1-200 m/min.

When the porous substrate passes through the nozzles, the pre-filler solution may be spraying coated to the flow channel side of the porous substrate to provide a pre-filler solution loaded portion of the porous substrate. The membrane solution is subsequently cast to the porous side of the pre-filler loaded porous substrate. After the membrane solution is solidified, a filter layer is formed on the porous substrate.

In some embodiments, the pre-filler solution is spraying coated to the porous side of the porous substrate to provide a pre-filler solution loaded portion of the porous substrate.

Figure 5:
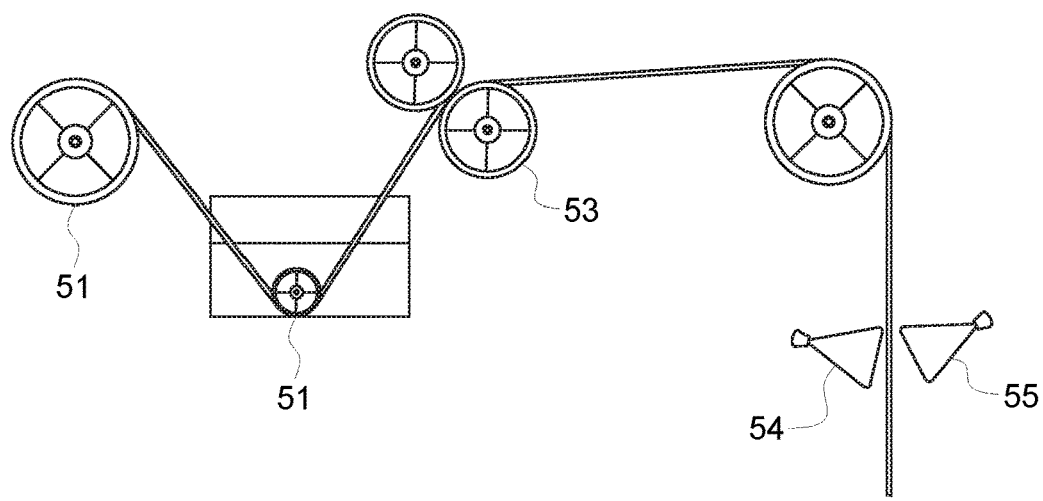
FIG. 5 shows a schematic drawing of a method for preparing a membrane in accordance with yet another exemplary embodiment of the present invention.

Referring to FIG. 5, it shows a further exemplary embodiment of the present invention for preparing a membrane in a continuous wetting process. In some embodiments, a porous substrate having a thickness of 250-450 microns is unwounded from a roller 51. The unwounded porous substrate is dip coated with a pre-filler solution in a vessel 52. After passing the porous substrate loaded with the pre-filler solution through a nip roll 53, a part of the pre-filler solution is removed from the porous substrate. Then, the porous substrate passes through a pair of slot dies 54 and 55 to be applied with a membrane solution. After the membrane solution is solidified, two filter layers are formed on both sides of the porous substrate.

In some embodiments, a porous substrate with 450-600 microns in thickness has a plurality of pores having a pore size around 150-400 microns, which is unwounded from a roller 51. The unwounded porous substrate is dip coated with a pre-filler solution in a vessel 52. After passing the porous substrate comprising a pre-filler solution through a nip roll 53, the pre-filler solutions is removed from the surface portions of the porous substrate, so as to provide a pre-filler layer only occupying the middle portion of porous substrate. Then, the porous substrate in which the pre-filler layer only occupies the middle portion of the porous substrate passes through a pair of slot dies 54 and 55, the surfaces of the porous substrate are coated with a membrane solution. After the membrane solution is solidified, two filter layers are formed adjacent to two side surface portions of the porous substrate.

In some embodiments, the pre-filler solution is poured on the porous substrate which is placed on a glass substrate with the flow channel side thereof facing the glass substrate. The pre-filler solution on the upper portion of the porous substrate may be removed before a membrane solution is cast to the pre-filler loaded porous substrate and is then quickly solidified. The porous substrate is then reversed, and is loaded with a pre-filler solution on the flow channel side thereof. After the pre-filler solution on the upper portion of the porous substrate is removed, the membrane solution is cast on the pre-filler loaded porous substrate and is then quickly solidified, thereby a double-side membrane is formed.

Embodiments of the present invention relate to a membrane comprising a porous substrate and a filter layer on the porous substrate. The membrane as prepared according to the embodiments of the present invention may be used for ultrafiltration (UF), reverse osmosis (RO), forward osmosis (FO), nanofiltration (NF), gas separation membrane, biofuel cell membrane and so on.

In some embodiments, the membrane, also referred as integrated membrane, has a thickness in a range of from 100 microns to 1000 microns, from 300 microns to 800 microns, or from 300 microns to 500 microns. In some embodiments, the membrane comprises porous substrate and one filter layer on the surface portion of one side of the porous substrate (i.e., a single-side membrane), wherein the membrane has a thickness in a range of from 100 microns to 1000 microns, from 300 microns to 800 microns, or from 300 microns to 350 microns. In some embodiments, the membrane comprises porous substrate and two filter layers on surface portions of both sides of the porous substrate (i.e., a double-side membrane), wherein the membrane has a thickness in a range of from 100 microns to 1000 microns, from 300 microns to 800 microns, or from 300 microns to 450 microns.

In comparison with those woven/nonwoven materials used in the traditional membranes for supporting the filter layer, the materials of the porous substrate, such as PET, PTFE, PP and etc., are more durable, particularly in more alkaline environments.

As can be seen from the following examples, the filter layers of the membrane of embodiments of the present invention are smooth, uniform and free of pin-holes. The membranes according to embodiments of the present invention integrates a filter function and an effluent function into a membrane (i.e., a permeate carrying/collecting membrane); and the thickness of the membrane is reduced in comparison with a filter membrane comprising an individual porous substrate and an individual filter membrane sheet welded to the individual porous substrate.

Further, the structures of the membrane products, for example, a filter element for UF, RO, NF, forward osmosis (FO) and etc. are simplified.

Figure 6:
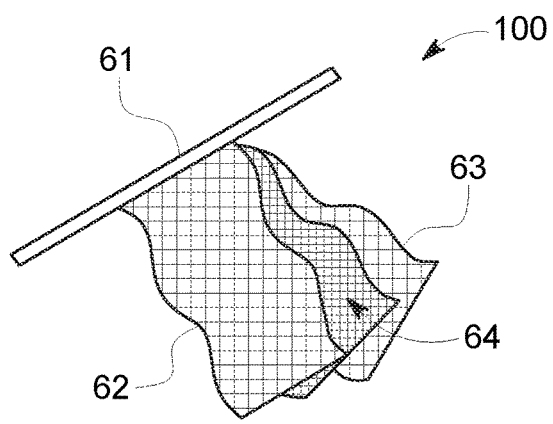
FIG. 6 shows a schematic drawing of a method for preparing a filter element according to an exemplary embodiment of the present invention.
Figure 7:
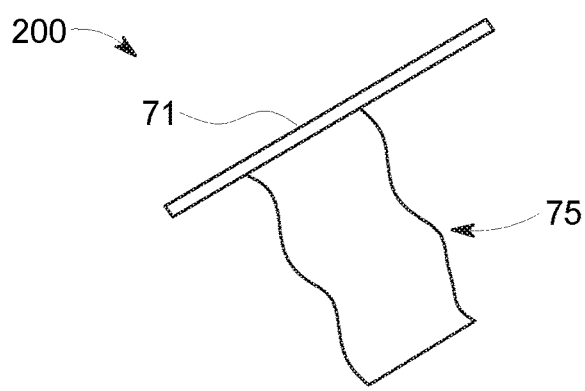
FIG. 7 shows a schematic drawing of a method for preparing a filter element according to another exemplary embodiment of the present invention.

In some embodiments, the membranes 62 and 63 are rolled around a core tube 61 to prepare a filter element 100 (see, FIG. 6). The core tube as disclosed herein refers to a hollow tube with a plurality of holes, for fluid communication, on the tube wall.

In some embodiments, two membranes 62 and 63 as well as a feed spacer 64 disposed between the two membranes 62 and 63 are stacked and rolled around the core tube 61 to prepare the filter element 100.

The feed spacer as disclosed herein refers to a polymer substrate comprising a porous structure. The feed spacer comprises polyethylene terephthalate (PET), polytetrafluoroethylene (PTFE), polyolefin, polyester, or any combinations thereof.

In some embodiments, the membranes 75 are rolled around the core tube 71 to prepare the filter element 200. In some embodiments, an end of a lead porous substrate may be wrapped around the core tube 71. In some embodiments, a plurality of membranes may be folded with surface portions thereof facing inwardly, wherein a feed spacer is inserted between the folded membranes to provide an envelop of the membrane. A plurality of envelops are stacked on the lead porous substrate, with external portions of the envelops being bonded to each other. The envelops are then rolled around the core tube to obtain a filter element.

As can be seen from the following examples, the filter elements as obtained according to embodiments of the present invention have a better flux and comparable salt rejection performance in comparison with conventional filter elements.

EXAMPLES

Example 1 Preparation of a Membrane

Figure 2:
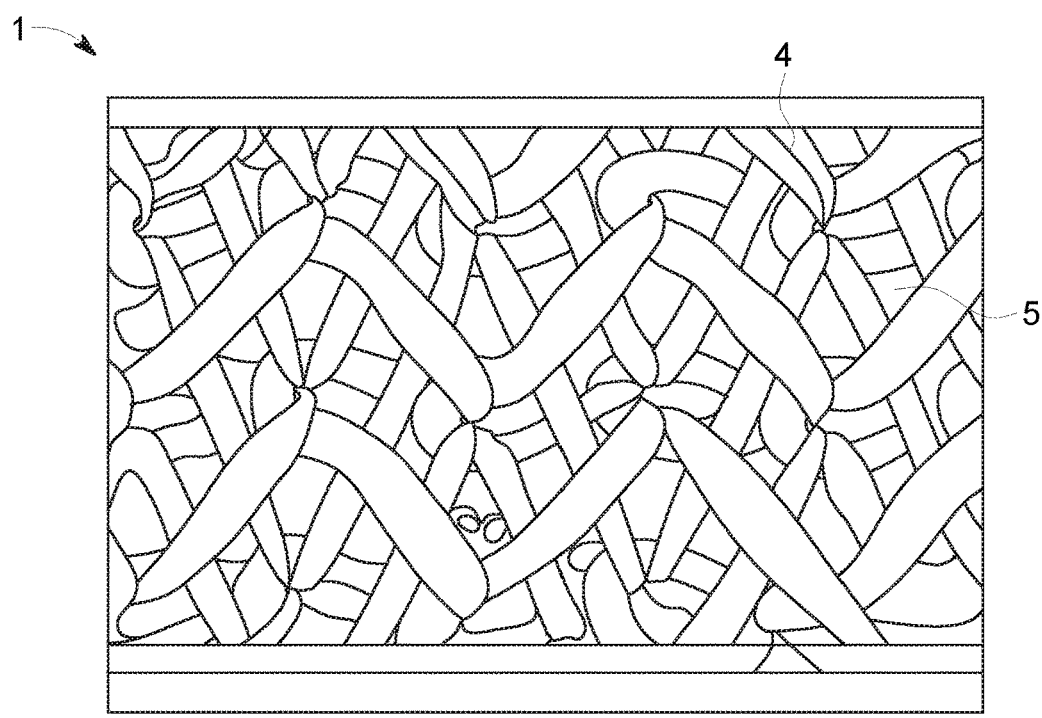
FIG. 2 illustrates an SEM image of the other side comprising a plurality of pores of the porous substrate of FIG. 1.

A permeate carrier with a thickness of 250 microns was provided. The permeate carrier had a plurality of pores having a diameter in a range of from 150 microns to 400 microns. The permeate carrier had an asymmetric structure. One side comprises flow channels (FIG. 1) and the other side comprises a porous structure (FIG. 2).

Then, water as a pre-filler solution was poured onto the permeate carrier which was placed on a glass substrate with flow channel side facing the glass substrate. The pre-filler solution on the top part of permeate carrier was removed by paper or absorption mat under the pressure of rubber roller.

A 17 wt % PSU dope solution in N,N-dimethyl formamide was east onto the pre-filler loaded permeate carrier and then quickly transferred to a water gel bath to solidify the filter layer.

It was observed that the membrane as prepared comprised a uniform and smooth coating surface with a thickness ~370 microns, and no pin-hole defects on the surface of the PSU membrane was visible by eyes.

Examples 2-3. Preparation of a Membrane

Membranes were prepared similar to Example 1 except that ethanol (Example 2) and glycerol (Example 3) were utilized as a pre-filler solution, respectively.

It was observed that all PSU filter layers comprised a uniform and smooth coating surface and no pin-hole defects on the surface of the PSU filter layers were visible by eyes.

Example 4 Preparation of a Double-Side Membrane

A permeate carrier with a thickness of 350 microns having a plurality of pores having a pore size around 150-400 microns was provided. Permeate carrier had an asymmetric structure. One side comprised flow channels and the other side comprised a porous structure. Then, water as a pre-filler solution was poured onto the permeate carrier which was placed on a glass substrate with flow channel side facing to glass substrate. the pre-filler solution on the top part of permeate carrier was removed by paper or absorption mat under the pressure of rubber roller.

A 17 wt % PSU dope solution in N,N-dimethyl formamide (membrane solution) was cast onto the pre-filler loaded permeate carrier and then quickly transferred to a water gel bath to solidify the membrane solution.

The obtained membrane is fixed on the glass plate with flow channelside facing up and loaded with a pre-filler solution onto the flow channel side. Then, a pre-filler solution on the top part of permeate carrier was also removed by paper or absorption mat under the pressure of rubber roller.

A 17 wt % PSU dope solution in N,N-dimethyl formamide was east onto the pre-filler loaded permeate carrier and then quickly transferred to a water gel bath to solidify the membrane solution.

It was observed that the membrane comprised a uniform and smooth coating surface with a thickness ~450 microns, and no pin-hole defects on the membrane surface of the PSU filter membrane were visible by eyes.

Example 5. Preparation of an RO Membrane

Figure 8:
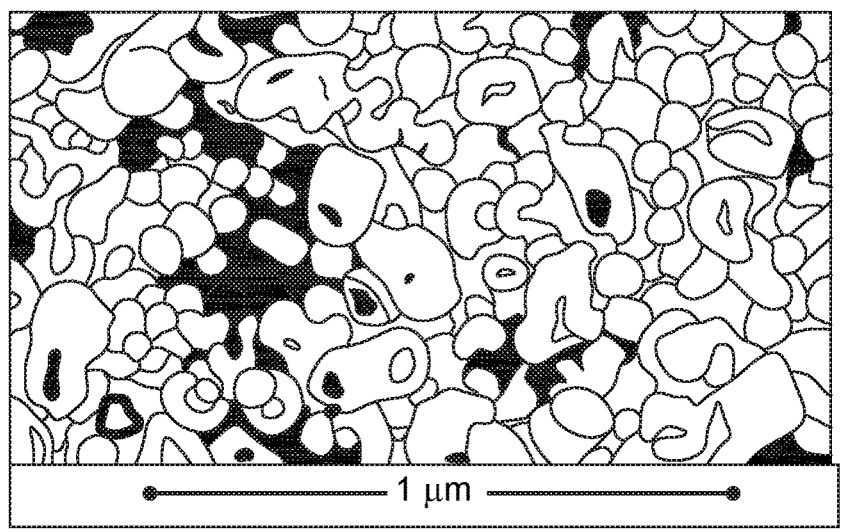
FIG. 8 shows an SEM image of a reverse osmosis (RO) coating on the membrane prepared in example 5.

An RO membrane was prepared by continuous RO coating processes using PSU membrane solution with line speed at 1 m/min. The permeate carrier was firstly incubated in aqueous solution containing 2.6 wt % meta-phenylenediamine (MPD), 3.1 wt % camphorsulfonic acid, and 1.4% trimethylamine for 7-8 s. The permeate carrier was then coated with PSU membrane solutions similar to above Examples. The coated membrane was blown by wind knife to remove the excess aqueous solution. Then, the coated membrane was dipped in 0.2 wt % solution of trimesoyl chloride (TMC) in Isopar G solvent for 7-8 s followed by baking at 100° C. for 2 min. FIG. 8 shows a SEM image of the reverse osmosis (RO) coating on the membrane. The performance of RO membrane was measured by 2000 ppm NaCl at 200 psi. The salt rejection was 94.5% and the flux was 30.4 galion/foot$^2$*day (gfd).

Example 6. Preparation of a Filter Element

A core tube, and a plurality obtained membranes were rolled around the core tube as follows (with reference to FIG. 6): (1) providing a core tube on which an end of a lead permeate carrier was wrapped; (2) folding membranes, with the surface portions facing inwardly; (3) inserting a feed spacer between the membranes as folded, to provide an envelop of the membranes; (4) stacking a plurality of the envelops on the lead permeate carrier, with external portions of the envelops being bonded each other; and (5) rolling up the envelops around the core tube to provide a filter element.

It was observed that the membrane was rolled up to a 1812 filter element, with a flux of 120 gpd & 94% rejection @2000 ppm NaCl and 220 psi testing for 1 h. The filter element was tested for another 200 hours, wherein the filter element had a flux of 110 gpd & 96% rejection by the end of 200 h testing, which indicates the membrane is durable under pressure.

Example 7

The membranes as obtained in Example 4 and a semipermeate membrane as a control were subjected to salt rejection testing and flux measurement, respectively.

As a control, a backing of PET non-woven fabric with PSU layer in 150 microns in thickness was soaked in aqueous solution containing 2 wt % meta-phenylenediamine (MPD), 4.6 wt % camphorsulfonic acid, and 2% trimethylamine for 30 seconds. The PET non-woven fabric had an average pore size of 1.6 microns. After coating with PSU solutions, the coated membrane was blown by wind knife to remove the excess aqueous solution. Then the coated membrane was dipped in 0.11 wt % solution of trimesoyl chloride (TMC) in Isopar G solvent for 60 s followed by removing the excess solution through wind knife. The obtained membrane was then baked at 100° C. for 6 min in a ventilation oven to achieve the reverse osmosis (RO) membrane.

The performance of RO membrane was measured by 2000 ppm NaCl at 200 psi. The salt rejection was 98.8% and the flux was 23.5 gfd. As to the control, the salt rejection was 98.7% and the flux was 22.8 gfd.

The above descriptions are merely embodiments of the invention and are not intended to restrict the scope of the invention. All kinds of variations and modifications could be made to the present invention to those skilled in the art. Any modifications, alternatives and improvements made within the spirit and principles of the present invention shall fall within the scope of the appended claims.

What we claim is:

1. A method for preparing a membrane, comprising:
   providing a porous substrate having an asymmetric structure including an exposed knitted first side and a second side, wherein the exposed knitted first side comprises flow channels in a direction parallel to a surface of the porous substrate and the second side comprises a porous structure having a mean pore size of 50-1000 microns;
   applying a pre-filler solution to at least partially occupy the flow channels in the exposed knitted first side, and to at least partially occupy pores in the second side of the porous substrate;
   applying a membrane solution to the second side of the porous substrate applied with the pre-filler solution, and;
   solidifying the membrane solution to form a filter layer on the porous substrate while leaving the flow channels at least partially free of the filter layer.

2. The method according to claim 1, wherein the pre-filler solution comprises water, organic liquids or combination thereof.

3. The method according to claim 2, wherein the organic liquids comprise alcohols, glycerol, ethylene glycol, N,N-dimethyl formamide (DMF), N-methyl pyrrolidone (NMP), dimethyl sulfoxide (DMSO), dimethylacetamide (DMAc) or any combination thereof.

4. The method according to claim 1, wherein the pre-filler solution is applied onto the exposed knitted first side of the porous substrate comprising the flow channels; and the membrane solution is applied onto the second side of the porous substrate comprising the porous structure.

5. The method according to claim 1, wherein applying the pre-filler solution and/or applying the membrane solution comprises spraying coating.

6. The method according to claim 1, wherein the pre-filler solution comprises a component for solidifying the membrane solution.

7. The method according to claim 1, wherein the porous substrate has a mean pore size of 100-1000 microns.

8. The method according to claim 1, wherein the membrane comprises a thickness in range of 300-1000 microns.

9. A membrane prepared by the method of claim 1.

10. The membrane according to claim 9, wherein the porous substrate comprises a plurality of pores having a pore size in range of 100-1000 microns.

11. The membrane according to claim 9, having a thickness in range of 300-800 microns.

12. The membrane according to claim 9, having a thickness in range of 300-500 microns.

13. The membrane according to claim 9, the membrane comprises a thickness in range of 100-1000 microns.

14. A filter element, comprising:
    (1) a core tube; and
    (2) a membrane prepared according to the method of claim 1 and rolled around the core tube.

15. The filter element according to claim 14, comprising a feed spacer.

16. The filter element according to claim 14, comprising a lead porous substrate.

17. The method according to claim 1, further comprising: either:
    applying an additional pre-filler solution to at least partially occupy the flow channels in the exposed knitted first side and applying an additional membrane solution to the exposed knitted first side applied with the additional pre-filler solution, or
    applying the membrane solution to the exposed knitted first side applied with the pre-filler solution; and
    solidifying the membrane solution or the additional membrane solution to form a filter layer on the exposed knitted first side.

18. The method according to claim 1,
    wherein applying the membrane solution to the porous substrate applied with a pre-filler solution comprises applying the membrane solution to both the exposed knitted first side and the second side of the porous substrate, and
    wherein solidifying the membrane solution comprises forming a filter layer on both the exposed knitted first side and the second side of the porous substrate while leaving the flow channels at least partially free of the filter layer.

19. The method according to claim 1, wherein the pre-filler solution is an aqueous solution comprising a first interfacial-polymerization reagent, and where the method further comprises:
    removing excess aqueous solution to provide an aqueous-coated filter layer, and applying an organic solution comprising a second interfacial-polymerization reagent to the aqueous-coated filter layer; and reacting the first and second interfacial-polymerization reagents to form an interfacial-polymerization layer.

\* \* \* \* \*